US006226042B1

United States Patent
Kondo et al.

(10) Patent No.: US 6,226,042 B1
(45) Date of Patent: May 1, 2001

(54) COLOR ENCODER

(75) Inventors: Masahito Kondo; Kyoji Marumoto, both of Kyoto (JP)

(73) Assignee: Rohn Co., Ltd., Kyoto (JP)

( * ) Notice: Subject to any disclaimer, the term of this patent is extended or adjusted under 35 U.S.C. 154(b) by 0 days.

(21) Appl. No.: 08/854,755

(22) Filed: May 12, 1997

(30) Foreign Application Priority Data

May 13, 1996 (JP) .................................................. 8-117684

(51) Int. Cl.[7] ...................................................... H04N 7/87
(52) U.S. Cl. .......................... 348/488; 348/478; 348/474; 348/476; 348/642
(58) Field of Search ..................................... 348/478, 488, 348/705, 659, 660, 663, 642, 724, 500, 454, 474, 476; 386/83, 46, 109, 33; 360/8, 60; 380/5, 15; 315/383, 384; H04N 7/87

(56) References Cited

U.S. PATENT DOCUMENTS

| 4,271,409 | * | 6/1981 | Filliman | 340/703 |
| 4,553,176 | * | 11/1985 | Mendrala | 386/4 |
| 4,646,161 | * | 2/1987 | Tsuchiya et al. | 348/227 |
| 4,823,186 | * | 4/1989 | Muramatsu | 348/236 |
| 4,982,179 | * | 1/1991 | Ogaea et al. | 348/642 |
| 5,031,031 | * | 7/1991 | Ikuhara | 348/642 |
| 5,333,054 | * | 7/1994 | Tanaka et al. | 348/666 |
| 5,374,965 | * | 12/1994 | Kanno | 348/705 |
| 5,469,218 | * | 11/1995 | Sakaegi et al. | 348/455 |
| 5,471,251 | * | 11/1995 | Inaba et al. | 348/634 |
| 5,587,746 | * | 12/1996 | Nakakuki | 348/708 |
| 5,638,135 | * | 6/1997 | Mukai | 348/642 |
| 5,691,819 | * | 11/1997 | Uchida et al. | 386/109 |
| 5,703,993 | * | 12/1997 | Kondo et al. | 386/35 |
| 5,748,259 | * | 5/1998 | Kang | 348/643 |
| 5,751,366 | * | 5/1998 | Hobbs | 348/479 |
| 5,786,865 | * | 7/1998 | Ayzenberg et al. | 348/505 |
| 5,809,203 | * | 9/1998 | Hwangbo | 386/70 |
| 5,845,041 | * | 12/1998 | Ohkuma et al. | 386/68 |
| 5,845,043 | * | 12/1998 | Yanagihara | 386/109 |

FOREIGN PATENT DOCUMENTS

06164967 * 6/1994 (JP) .

* cited by examiner

Primary Examiner—Reinhard Eisenzopf
Assistant Examiner—Linus H. Lo
(74) Attorney, Agent, or Firm—Arent Fox Kintner Plotkin & Kahn, PLLC

(57) ABSTRACT

A color encoder is incorporated in an apparatus for reproducing a signal recorded on a disk for a video-CD, CD-G, or similar system. The color encoder serves as an interface between such an apparatus and a television receiver. The color encoder converts R, G, and B signals reproduced from a disk into a color television signal. The color encoder is provided with a circuit for generating a blanking interval control signal that is used to switch between blanking intervals of different duration in accordance with a select signal, so that the duration of the time interval during which video signals are suppressed can be selectively varied. The color encoder has, in the input paths for the R, G, and B signals, switches for enabling and disabling the passage of those signals, and these switches are controlled by the blanking control signal.

9 Claims, 4 Drawing Sheets

COLOR ENCODER

BACKGROUND OF THE INVENTION

1. Field of the Invention

The present invention relates to a color encoder that is used in an image reproduction apparatus such as a video-CD or CD-G player so as to serve as an interface between such an apparatus and a television receiver.

2. Description of the Prior Art

A color encoder produces a television signal from R, G, and B signals it receives. The television signal includes a vertical return trace blanking interval between vertical scanning intervals. As shown in FIG. 4, a vertical return trace blanking interval lasts for a time interval of 21 H (1 H represents the duration of one horizontal scanning interval). Within one vertical return trace blanking interval, the first 9 H time interval consists of a vertical synchronizing signal interval T2 lasting for 3 H and containing six upward-rising pulses (cut-in pulses K), and two equalizing intervals T1 and T3, one immediately preceding the vertical synchronizing interval and the other immediately succeeding it, of which each contains six downward-dropping pulses (equalizing pulses Q). This first 9 H time interval of the vertical return trace blanking interval serves to stabilize the horizontal and vertical scanning of a television receiver. The intervals T1, T2, and T3 each last for a time interval of 3H. The remaining 12 H time interval of the vertical return trace blanking interval consists of horizontal scanning pulses HS and color bursts BST (a color synchronizing signal). To cope with such composition of the vertical return trace blanking interval, a color encoder blanks (suppresses) the R, G, and B signals it receives during the vertical return trace blanking interval.

In recent years, new image data transmission methods have been proposed to make effective use of the vertical return trace blanking interval. In such methods, various signals for testing and for transmitting character-based information (hereinafter referred to as closed-caption signals) are superposed on the R, G, and B signals during particular horizontal scanning intervals within the vertical return trace blanking interval, for example, from the 14th through 16th horizontal scanning intervals $H_{14}$ to $H_{16}$ and during the 21st horizontal scanning interval $H_{21}$.

However, since a conventional color encoder as described above blanks the R, G, and B signals without fail during every vertical return trace blanking interval, it cannot deliver test signals or closed-caption signals to a television receiver even if such signals are transmitted during the vertical return trace blanking interval, and thus it does not allow the reproduction of those signals on the television receiver.

To solve this problem, a modified color encoder has been devised to allow the reproduction of closed-caption signals on a television receiver. Specifically, this color encoder is designed not to suppress the R, G, and B signals during particular horizontal scanning intervals within the vertical return trace blanking interval, for example, in the example noted above, from the 14th through 16th horizontal scanning intervals $H_{14}$ to $H_{16}$ and during the 21st horizontal scanning interval $H_{21}$.

This type of color encoder, however, admits and processes the R, G, and B signals without fail during particular intervals within the vertical return trace blanking interval, and accordingly, even if the signals thus admitted include signals other than test or closed-caption signals, those signals are delivered to the television receiver and may cause malfunction thereof.

SUMMARY OF THE INVENTION

An object of the present invention is to provide a color encoder that allows the reproduction of closed-caption signals on a television receiver without causing malfunction thereof even when signals other than closed-caption signals are transmitted.

To achieve the above object, according to the present invention, a color encoder that receives R, G, and B signals and outputs a television signal is provided with means for varying duration of a time interval during which color video signals are suppressed within a vertical return trace blanking interval.

Specifically, a color encoder according to the present invention is provided with RGB input terminals for receiving R, G, and B signals reproduced from a recording medium; a latch circuit for latching the R, G, and B signals; a luminance signal forming circuit for forming a luminance signal from the R, G, and B signals latched by the latch circuit; a color-difference signal forming circuit for forming a color-difference signal from the R, G, and B signals latched by the latch circuit; a modulation circuit for modulating a color carrier with the color-difference signal outputted from the color-difference signal forming circuit; an adder circuit for adding together an output of the modulation circuit and the luminance signal; a select signal input terminal; a blanking signal generating circuit for generating a blanking signal that determines duration of a blanking interval within a vertical return trace blanking interval in accordance with a select signal received via the select signal input terminal; and a switch circuit that is provided between the RGB input terminals and the latch circuit and that is controlled by the blanking signal outputted from the blanking signal generating circuit such that the switch circuit is either in a state in which it passes the R, G, and B signals or in a state in which it suppresses the R, G, and B signals.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
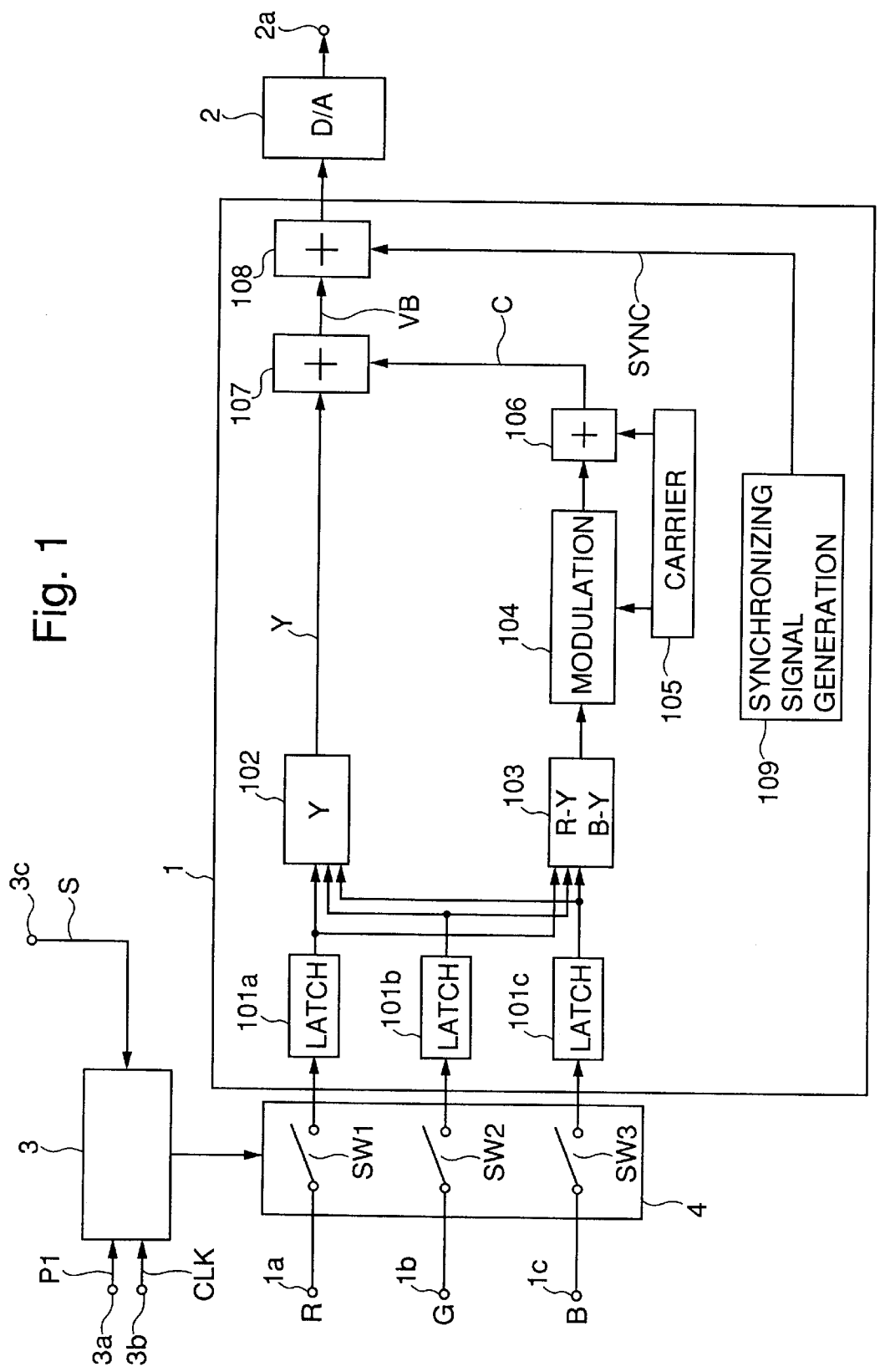
FIG. 1 is a block diagram of a color encoder embodying the present invention.

Hereinafter, an embodiment of the present invention will be described with reference to the drawings. FIG. 1 is a block diagram of a color encoder embodying the present invention. In FIG. 1, numeral 1 represents an encoder, numeral 2 represents a D/A (digital-to-analog) conversion circuit, numeral 3 represents a blanking signal generating circuit, and numeral 4 represents a switching circuit. Numerals 1a, 1b, and 1c represent input terminals for receiving R, G, and B signals. These input terminals 1a, 1b, and 1c are connected, for example, to an MPEG core chip, which is a device that decompresses image data and outputs R, G, B signals. Numeral 2a represents an output terminal for outputting a television signal. Numerals 3a, 3b, and 3c represent input terminals at which the blanking signal generating circuit 3 receives reset pulses P1, a clock CLK, and a select signal S, respectively.

The construction and operation of the encoder 1 are as follows. Latch circuits 101a, 101b, and 101c latch received R, G. and B signals and then output them. A luminance signal forming circuit 102 forms and outputs a luminance signal Y in accordance with the R, G, and B signals.

A color-difference signal forming circuit 103 forms R-Y and B-Y signals in accordance with the R, G, and B signals, and outputs the R-Y and B-Y signals to a modulation circuit 104, where these signals modulate a color carrier supplied from a color carrier generating circuit 105 to form a modulated signal. An adder 106 inserts the color carrier as color bursts into color burst positions of the modulated signal to form a chrominance signal C.

Another adder 107 adds together the luminance signal Y and the chrominance signal C to form and output a color video signal VB. A synchronizing signal generating circuit 109 generates a composite synchronizing signal SYNC that includes horizontal and vertical synchronizing. signals and horizontal and vertical blanking signals. Still another adder 108 adds the color video signal VB and the composite synchronizing signal SYNC to form and output a digital television signal.

The D/A conversion circuit. 2 receives the digital television signal, converts it into an analog television signal, and then outputs the analog television signal to the output terminal 2a. This output terminal 2a is connected, for example, to a television receiver. The circuit shown in FIG. 1 is formed in a single IC chip.

Figure 2:
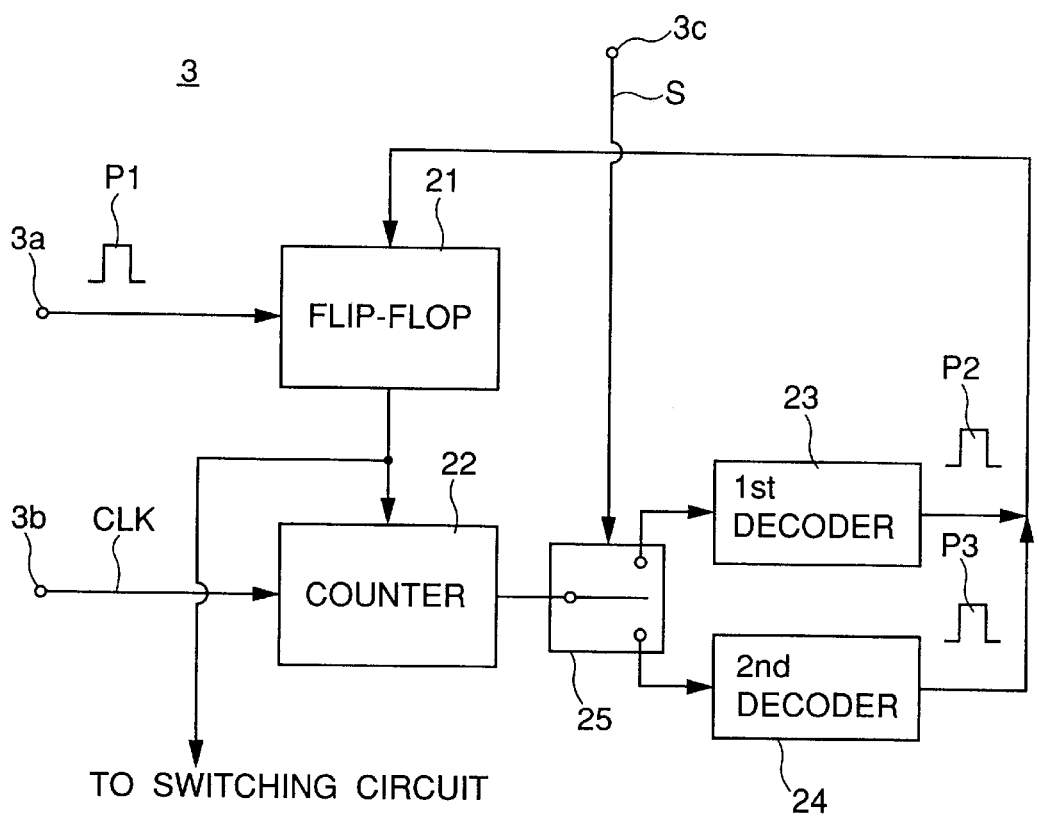
FIG. 2 is a diagram showing the construction of the blanking signal generating circuit used in the color encoder shown in FIG. 1.

As shown in FIG. 2, the blanking signal generating circuit 3 is composed of a flip-flop 21 that outputs a high-level voltage when it receives the reset pulse P1 via the terminal 3a at the start of every vertical blanking interval, a counter 22 that operates while the flip-flop outputs a high-level voltage, a first decoder 23 that generates a pulse P2 when the count value of the counter 22 reaches a value corresponding to the end of the 21st horizontal scanning interval of the vertical return trace blanking interval, a second decoder 24 that generates a pulse P3 when the count value of the counter 22 reaches a value corresponding to the end of the ninth horizontal scanning interval of the vertical return trace blanking interval, and a switch 25. As the reset pulse P1, pulses formed from the vertical synchronizing signal are used; as the clock. CLK, the horizontal synchronizing signal is used. The generation of a reset pulse P1 at the start of every vertical return trace blanking interval can be achieved simply by counting, with another counter, the horizontal synchronizing signal in the vertical synchronizing pulse of the preceding field.

In accordance with the select signal S supplied at the terminal 3c, the switch 25 selects either the first decoder 23 or the second decoder 24 so that only one of the two decoders is activated at a time. For example, if the terminal 3C is realized as an external terminal of the IC (in which the color encoder shown in FIG. 1 is formed), it is possible to externally control the duration of the blanking interval by the use of the select signal S. The switch 25 may be provided on the output sides of the first and second decoders 23 and 24 so that it switches between the outputs of the first and second decoders 23 and 24. The select signal S is a two-level signal that can have either a high-level voltage or a low-level voltage, and thus the switch 25 receives either a high-level voltage or low-level voltage. The level of the select signal S is determined, for example, through the operation of an operation member by the user viewing the television screen. Alternatively, it is also possible to provide an additional detection circuit for detecting a specific signal inserted within the vertical return trace blanking interval so that the level of the select signal S is automatically changed in accordance with the output from this detection circuit.

Figure 3:
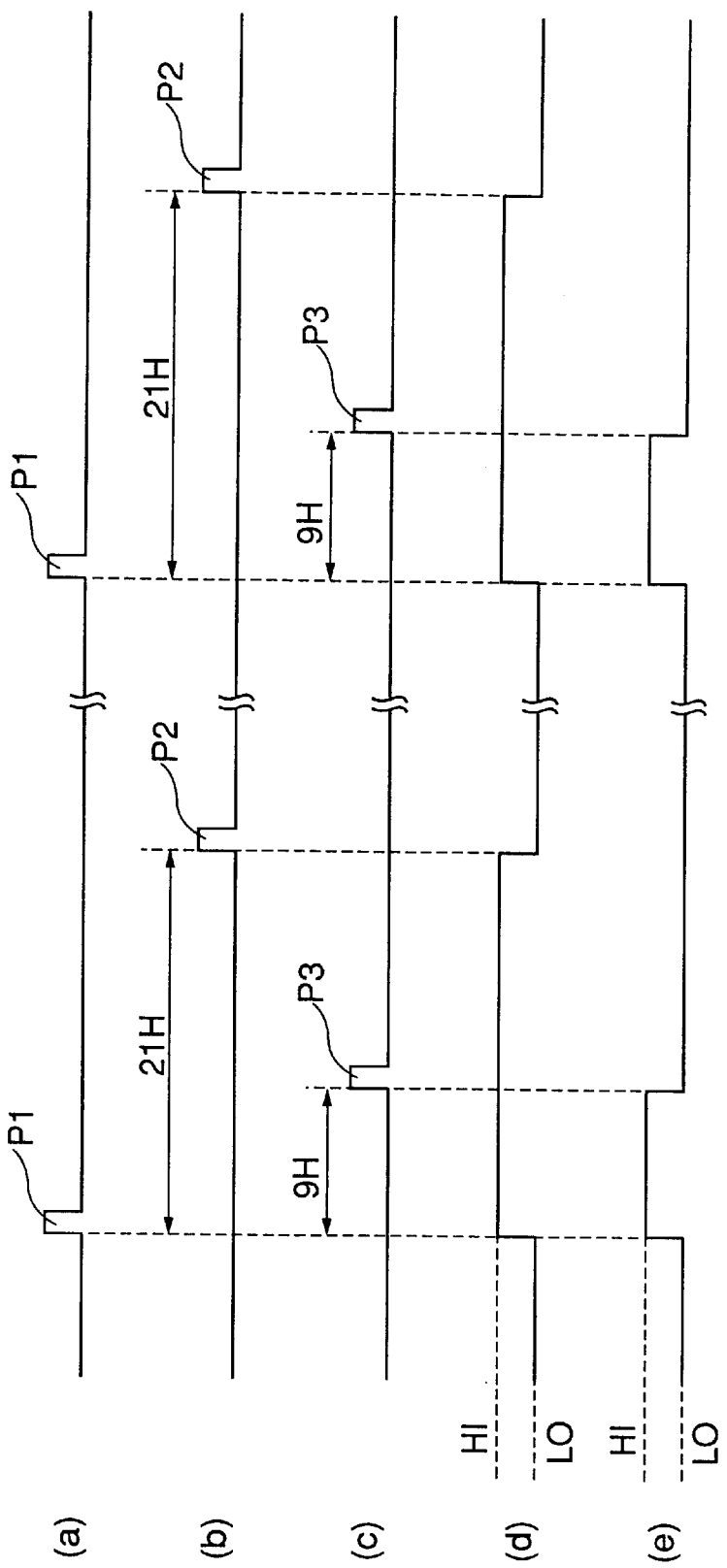
FIG. 3 is a diagram showing the interrelation between the principal signals appearing in the counter shown in FIG. 2.
Figure 4:
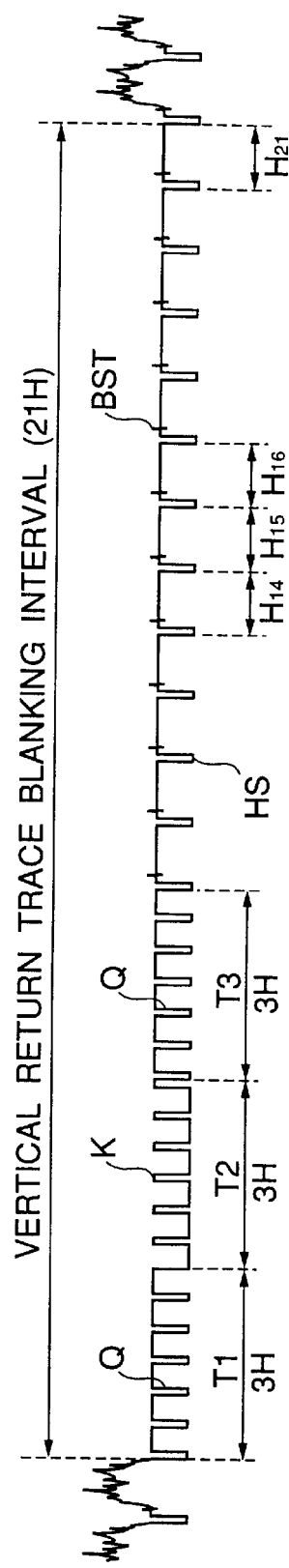
FIG. 4 is a diagram showing a television signal during the vertical return trace blanking interval.

Now, suppose that the first decoder 23 is being selected by the select signal S. When the flip-flop 21 receives a reset pulse P1, its output rises to a high-level voltage HI as shown at (d) of FIG. 3, and this causes the counter 22 to start counting pulses in the clock CLK it receives via the terminal 3b. When the count value reaches the value corresponding to the end of the 21st horizontal scanning interval, the first decoder 23 outputs a pulse P2 as shown at (b) of FIG. 3. This pulse P2 is given to the flip-flop 21, so that the flip-flop 21 inverts its output to a low-level voltage LO as shown at (d) of FIG. 3.

Accordingly, while the first decoder 23 is being selected by the select signal S, the flip-flop 21 holds its output high from the first through 21st horizontal scanning intervals. During these intervals, the switches SW1, SW2, and SW3 constituting the switch circuit 4 in FIG. 1 are kept open, and thus the R, G, and B signals are suppressed only from the first through 21st horizontal scanning intervals, that is, throughout the vertical return trace blanking interval.

Next, suppose that the second decoder 24 is being selected by the select signal S. When the flip-flop 21 receives a reset pulse P1, its output rises to a high-level voltage HI as shown at (e) of FIG. 3, and this causes the counter 22 to start counting pulses in the clock CLK it receives via the terminal 3b. When the count value reaches the value corresponding to the end of the ninth horizontal scanning interval, the second decoder 24 outputs a pulse P3 as shown at (c) of FIG. 3. This pulse P3 is given to the flip-flop 21, so that the flip-flop 21 inverts its output to a low-level voltage LO as shown at (e) of FIG. 3.

Accordingly, while the second decoder 24 is being selected by the select signal S, the flip-flop 21 holds its output high from the first through ninth horizontal scanning intervals. During these intervals, the switches SW1, SW2, and SW3 constituting the switch circuit 4 in FIG. 1 are kept open, and thus the R, G, and B signals are suppressed only from the first through ninth horizontal scanning intervals.

As described above, according to the present invention, it is possible to realize a color encoder that can vary the interval during which color video signals are suppressed within the vertical blanking interval. Accordingly, with a color encoder embodying the present invention, it is possible, by varying the color-video-signal-blanking interval in accordance with signals transmitted during the vertical return trace blanking interval, to reproduce closed-caption signals on a television receiver without causing abnormal operation thereof even when signals other than closed-caption signals are transmitted.

What is claimed is:

1. A color encoder comprising:

RGB input terminals for receiving R, G, and B signals reproduced from a recording medium;

a latch circuit for latching the R, G, and B signals;

a luminance signal forming circuit for forming a luminance signal from the R, G, and B signals latched by the latch circuit;

a color-difference signal forming circuit for forming a color-difference signal from the R, G, and B signals latched by the latch circuit;

a modulation circuit for modulating a color carrier with the color-difference signal outputted from the color-difference signal forming circuit;

an adder circuit for adding together an output of the modulation circuit and the luminance signal;

a select signal input terminal;

a blanking signal generating circuit for generating a blanking signal that varies a duration of a blanking interval within a vertical return trace blanking interval in accordance with a select signal received via the select signal input terminal;

a switch circuit that is provided between the RGB input terminals and the latch circuit and that is controlled by the blanking signal outputted from the blanking signal generating circuit such that the switch circuit is either in a state in which it passes the R, G, and B signals or in a state in which it suppresses the R, G, and B signals;

wherein said blanking signal generating circuit outputs alternatively one of the first blanking signal and the second blanking signal in accordance with the select signal fed thereto; and wherein said switch circuit, when the first blanking signal is fed thereto, determines the whole vertical return trace blanking interval to be the blanking interval and, when the second blanking signal is fed thereto, determines part of the vertical return trace blanking interval to be the blanking interval.

2. A color encoder as claimed in claim 1, wherein said blanking signal generating circuit comprises:

a flip-flop that sets its output to a first level when it receives a pulse indicating a start of the return trace interval;

a counter that counts a horizontal synchronizing signal as a clock while the flip-flop is holding its output at the first level;

first and second decoders of which each decodes an output of the counter and produces a pulse at a different count value;

transmitting lines through which the pulses generated by the first and second decoders are supplied to the flip-flop; and a selecting circuit that is connected to the select signal input terminal and that activates one of the first and second decoders in accordance with the select signal, wherein the flip-flop, on receiving the pulse generated by the first or the second decoder, sets its output to a second level and deactivates the counter.

3. A color encoder as claimed in claim 2, wherein said selecting circuit is composed of a switch.

4. A color encoder as claimed in claim 1, wherein said R, G, and B signals are in digital format.

5. A color encoder as claimed in claim 1, wherein said color encoder is formed in a single IC chip.

6. A color encoder as claimed in claim 1, wherein said color encoder is incorporated in an apparatus for reproducing a signal recorded on a disk for a video or a video CD-G, so as to serve as an interface between the apparatus and a television receiver.

7. A color encoder as claimed in claim 9, wherein said changing means has a switch circuit in input paths for the R, G, and B signals.

8. A color encoder as claimed in claim 7, wherein said blanking signal generating circuit has a terminal for receiving a select signal and outputs alternatively one of the first blanking signal and the second blanking signal in accordance with the select signal received at said terminal, and wherein said changing means, when the first blanking signal is fed thereto, keeps said switch open throughout the whole vertical return trace blanking interval and, when the second blanking signal is fed thereto, keeps said switch open only for part of the vertical return trace blanking interval.

9. A color encoder for processing R, G, and B signals fed thereto so as to output a color television signal, comprising:

a blanking signal generating circuit for generating alternatively one of a first blanking signal and a second blanking signal; and changing means for changing a duration of a blanking interval within a vertical return trace blanking interval of the color television signal in response to a blanking signal fed thereto in such a way that the blanking interval has a different duration in accordance with whether the changing means receives the first blanking signal or the second blanking signal.

* * * * *